(12) United States Patent
Tochihira et al.

(10) Patent No.: US 10,822,527 B2
(45) Date of Patent: Nov. 3, 2020

(54) THERMOSETTING ADHESIVE COMPOSITION, THERMOSETTING ADHESIVE FILM, AND COMPOSITE FILM

(71) Applicant: Tomoegawa Co., Ltd., Tokyo (JP)

(72) Inventors: Jun Tochihira, Yaizu (JP); Ryu Harada, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 118 days.

(21) Appl. No.: 15/542,115

(22) PCT Filed: Jan. 19, 2016

(86) PCT No.: PCT/JP2016/051429
§ 371 (c)(1),
(2) Date: Jul. 7, 2017

(87) PCT Pub. No.: WO2016/117554
PCT Pub. Date: Jul. 28, 2016

(65) Prior Publication Data
US 2018/0258324 A1  Sep. 13, 2018

(30) Foreign Application Priority Data

Jan. 19, 2015  (JP) ................................ 2015-008180
Oct. 27, 2015  (JP) ................................ 2015-210645

(51) Int. Cl.

| | | |
|---|---|---|
| C09J 7/35 | (2018.01) | |
| B32B 27/00 | (2006.01) | |
| C09J 7/20 | (2018.01) | |
| C09J 4/06 | (2006.01) | |
| C08F 290/06 | (2006.01) | |
| C08F 257/02 | (2006.01) | |
| C09J 7/25 | (2018.01) | |
| C09J 7/22 | (2018.01) | |
| B32B 15/082 | (2006.01) | |
| B32B 15/085 | (2006.01) | |
| B32B 27/20 | (2006.01) | |
| B32B 27/28 | (2006.01) | |
| B32B 27/30 | (2006.01) | |
| C08F 222/40 | (2006.01) | |
| C08F 212/34 | (2006.01) | |

(52) U.S. Cl.
CPC .............. *C09J 7/35* (2018.01); *B32B 15/082* (2013.01); *B32B 15/085* (2013.01); *B32B 27/00* (2013.01); *B32B 27/20* (2013.01); *B32B 27/281* (2013.01); *B32B 27/302* (2013.01); *C08F 257/02* (2013.01); *C08F 290/062* (2013.01); *C09J 4/06* (2013.01); *C09J 7/20* (2018.01); *C09J 7/22* (2018.01); *C09J 7/255* (2018.01); *B32B 2270/00* (2013.01); *B32B 2457/08* (2013.01); *C08F 212/34* (2013.01); *C08F 222/40* (2013.01); *C09J 2203/326* (2013.01); *C09J 2400/163* (2013.01); *C09J 2400/226* (2013.01); *C09J 2453/00* (2013.01); *C09J 2467/006* (2013.01); *C09J 2479/08* (2013.01)

(58) Field of Classification Search
None
See application file for complete search history.

(56) References Cited

U.S. PATENT DOCUMENTS

| | | | | |
|---|---|---|---|---|
| 2008/0300350 A1* | 12/2008 | Ohno | ................... | C08F 283/06 524/147 |
| 2017/0313854 A1* | 11/2017 | Kobayashi | ................. | C08J 5/24 |

FOREIGN PATENT DOCUMENTS

| | | |
|---|---|---|
| CN | 101314630 A | 12/2008 |
| JP | 07323591 A | 12/1995 |
| JP | 2004352817 A | 12/2004 |
| JP | 2005239767 A | 9/2005 |
| JP | 2006083364 A | 3/2006 |
| JP | 2008248141 A | 10/2008 |
| JP | 2009161725 A | 7/2009 |
| JP | 2010174242 A | 8/2010 |
| JP | 2011068713 A | 4/2011 |
| JP | 2012041372 A | 3/2012 |
| JP | 2012051989 A | 3/2012 |
| JP | 2012234894 A | 11/2012 |
| JP | 2013245320 A | 12/2013 |
| JP | 2015131866 A | 7/2015 |

(Continued)

OTHER PUBLICATIONS

Machine translation of WO 2014148155 A1, retrieved Nov. 25, 2018. (Year: 2014).*

(Continued)

*Primary Examiner* — Callie E Shosho
*Assistant Examiner* — Krupa Shukla
(74) *Attorney, Agent, or Firm* — Wood Heeron & Evans LLP

(57) ABSTRACT

This thermosetting adhesive composition contains as a component (A) a vinyl compound in which a terminal end of a bifunctional polyphenylene ether oligomer is converted to a vinyl group, as a component (B) a maleimide resin, and as a component (C) a thermoplastic elastomer, the equivalent ratio of vinyl groups in the component (A) and maleimide groups in the component (B) being 1.0:0.5 to 1.0:4.0, the proportion of the component (C) in the total weight of the component (A), the component (B), and the component (C) being 55 to 95% by weight, the ratio of styrene units of the component (C) with respect to the total weight of the component (C) being 10 to 40% by weight, the tensile stress at 100% elongation being 0.1 to 2.9 MPa, and the elongation at break being 100% or greater.

11 Claims, No Drawings

(56) References Cited

FOREIGN PATENT DOCUMENTS

| TW | 201422705 A | 6/2014 |
|----|-------------|--------|
| TW | 201439202 A | 10/2014 |
| WO | 2011132674 A1 | 10/2011 |
| WO | 2014064986 A1 | 5/2014 |
| WO | 2014148155 A1 | 9/2014 |

OTHER PUBLICATIONS

Machine translation of JP 2011068713 A, retrieved Dec. 21, 2018. (Year: 2011).*
PCT Office, International Search Report issued in PCT/JP2016/051429 dated Mar. 22, 2016, 4 pages.
Taiwanese Patent Office, Notice of Allowance issued in TW 105101510 dated Nov. 3, 2016, 5 pages.

* cited by examiner

THERMOSETTING ADHESIVE COMPOSITION, THERMOSETTING ADHESIVE FILM, AND COMPOSITE FILM

TECHNICAL FIELD

The present invention relates to a thermosetting adhesive composition characterized by having low dielectric properties, high adhesiveness, high heat-resistant properties, and high flexibilities, an adhesive film utilizing the adhesive composition, and a substrate-laminating adhesive film in which the adhesive film is laminated with a metal foil, a plastic film, or a paper, and a substrate-laminating adhesive film in which the adhesive film is laminated with a plastic film and a copper foil, and the thermosetting adhesive composition, the thermosetting adhesive film, and the substrate-laminating thermosetting adhesive film are useful as an adhesive and insulative raw material of a printed circuit, flexible printed circuit, a semiconductor lead frame, or the like.

The present invention claims priority on the basis of Japanese Patent Application No. 2015-8180 filed in Japan on Jan. 19, 2015, and Japanese Patent Application No. 2015-210645 filed in Japan on Oct. 27, 2015, the contents of which are incorporated herein by reference.

BACKGROUND OF THE INVENTION

In recent years, the densification, miniaturization, and thinning of electronic components constituting an electronic device have been strongly required accompanying performance-upgrading, miniaturization, and multi-functionalization of the electronic device such as a portable personal computers or a mobile phone. Characteristics required for constituent materials of the electronic components, such as a wiring board or a semiconductor package are also diversified, and demands for a flexible printed circuit (hereinafter, referred to as FPC) that realizes three-dimensional wiring even in a limited space has been increasing, for example.

The FPC generally has a structure in which a circuit pattern is formed on a copper foil laminated on a plastic film having a heat resistance and insulating properties, typified by polyimide, and the circuit pattern is filled with a thermosetting insulative resin and then is covered with another heat-resistant film. The film in which the uncured circuit pattern filling resin and the heat resistant film are integrated in advance is referred to as a cover lay film, and various types thereof have been proposed so far. In addition, it has been widely conducted that FPC is made to have a multi-layered structure for high-density mounting, and a bonding sheet obtained by processing a thermosetting adhesive agent into a thin sheet has been used to form the multi-layered structure.

Although insulating properties between a copper foil layer and another copper foil layer are ensured via a polyimide film in a FPC prepared by a general method utilizing a flexible copper clad laminate (hereinafter, referred to as FCCL) obtained by laminating a copper foil on a polyimide film or the like, a cover lay film, and a bonding sheet, a method in which a polyimide film or the like is not used and a thermosetting adhesive agent used in the cover lay film or the bonding sheet is utilized to ensure the insulating properties between the copper foil layers has been proposed corresponding to recent requests for high functionality, particularly thinning, of FPC. A FRCC (Flexible Resin Coated Copper) in which an uncured thermosetting adhesive layer and a copper foil are integrated is used in the method.

The cover lay film, the bonding sheet, and the FRCC are required not only to have a high adhesive strength relative to an insulative plastic film and a copper foil, but also to have a sufficiently high heat resistance to endure a soldering process and sufficiently high flexibilities to endure repeated folding. In addition, they are required to process a large volume of information at a high speed along with the progress of IT technology, increasing the frequency of transmission signals has been developing, and raw materials constituting the printed circuit are required to exhibit a low dielectric constant ($\varepsilon$) and a low dielectric tangent (tan $\delta$). It has been proposed to use a resin having properties of a low dielectric constant and a low dielectric tangent, such as a fluorine resin, a cyanate ester resin, or a polyphenylene ether resin, instead of conventional epoxy resins, in a printed circuit base material in which a glass cloth is impregnated with resin, that is, a prepreg. (For example, Patent Documents 1 to 3)

On the other hand, there are no choice for the prepreg but to use a glass having a higher dielectric constant and dielectric tangent as compared with the resin, it is obvious that it is difficult to provide the prepreg with very low dielectric properties, and there is a movement in response to the problem in which the increasing frequency is addressed with a FPC. Specifically, a FPC having low dielectric properties is prepared by using a liquid crystal polymer film (hereinafter, referred to as LCP film) having a lower dielectric constant and a lower dielectric tangent as compared with the polyimide film as a FPC substrate, and further using a cover lay film, a bonding sheet, and FRCC, having low dielectric properties.

By the way, the prepreg is prepared by impregnating a porous substrate such as a glass cloth with an impregnating resin solution diluted with a solvent, followed by drying the resultant, and therefore the impregnating resin solution used to prepare the prepreg is required to have a high solid content but have a low viscosity.

In addition, although it is effective to form multi-layers for miniaturization and densification in a printed circuit, the melt viscosity of the impregnating resin is required to be low, because a multi-layered printed circuit is prepared by covering a prepreg having a formed copper foil pattern with another prepreg, followed by heating and applying pressure thereon to embed the copper foil pattern with impregnating resin seeping from the prepregs.

It is not preferable to add a large amount of an elastomer in a raw material for the prepreg in response to the demand, because the addition of an elastomer, which is a compound having a high molecular weight, causes significantly increase in the viscosity of the impregnating resin solution and the melt viscosity of the impregnating resin.

In addition, the impregnating resin is required to have a low coefficient of linear expansion and a high glass transition temperature so as to prevent the occurrence of cracks due to temperature change in the printed circuit. In response to the demand, a thermosetting resin having a relatively low molecular thermosetting resin exhibiting a high rigidity and a high glass transition temperature after being cured has been widely used as an impregnating resin material. In contrast, since an elastomer is a material having a high coefficient of linear expansion and low glass transition temperature, it is not preferred that the elastomer is used as the main component of the prepreg impregnating resin (Patent Documents 3 and 4, for example).

Although a resin composition free from any elastomers or a resin composition containing an elastomer in an amount of 50% by weight or less, relative to the total weight of the resin composition, exhibits hard and brittle properties, a prepreg endures an actual use if the strength of a composite with a glass cloth is ensured, and the prepreg is not required to have high flexibilities due to the characteristics of the printed circuit. Since the resin composition for preparing prepreg itself is inevitably not required to have a high strength and high flexibilities, a resin composition free from any elastomers or a resin composition having a small amount of an elastomer is preferred as a raw material for prepreg.

On the other hand, contrary to the prepreg resin composition, the strength and the flexibilities of FPC raw materials when formed into a film are particularly important. In addition, it is also important that the melt viscosity of the FCP raw materials when laminated by heating and applying pressure thereon does not significantly decrease and the FCP raw materials do not flow out at the time.

In addition, the FCP raw materials are required to have high flexibilities even after being cured by heating so as to prevent deterioration of the flexibilities that are the most distinctive feature of FCP.

That is, the properties required for prepreg raw materials and those required for FCP raw materials are quite different from each other, and a resin composition containing a large amount of an elastomer having a high strength, high flexibilities, and a high melt viscosity is preferred as a FPC raw material.

Compositions containing a low-dielectric elastomer component and a thermosetting resin such as a polyfunctional vinyl aromatic copolymer, a polyphenylene ether oligomer, an epoxy, or a bismaleimide have been proposed as resin compositions having low dielectric properties (Patent Documents 5 to 7, for example), and it has been proposed that these composition is applied to form a cover lay film or a bonding sheet. In addition, a resin composition having a high adhesiveness relative to a LCP film has been disclosed in Patent Document 8 or 9.

However, the resin compositions described in the documents utilizes a mechanism in which the adhesion strength is exhibited accompanying curing of the thermosetting resin, the mechanism being on the extension of the conventional art, that is, a phenomenon in which the surface of an adherend having a polarity and the thermosetting resin having a polarity electrostatically pull against each other to exhibit the strength, and therefore high adhesiveness is not exhibited on both a LCP film, which is a material having a low polarity, and a copper, which is a material having a high polarity. In addition, no thermosetting adhesive composition having a low dielectric constant, a low dielectric tangent, a sufficiently high heat resistance to endure a rapid heating at a soldering process, and a sufficiently high flexibility to endure a folding has been provided.

DOCUMENTS OF RELATED ART

Patent Documents

Patent Document 1: Japanese Unexamined Patent Application, first publication No. H7-323501
Patent Document 2: Japanese Laid-open Patent Application No. 2005-239767
Patent Document 3: Japanese Laid-open Patent Application No. 2010-174242
Patent Document 4: Japanese Laid-open Patent Application No. 2012-51989
Patent Document 5: Japanese Laid-open Patent Application No. 2006-83364
Patent Document 6: Japanese Laid-open Patent Application No. 2008-248141
Patent Document 7: Japanese Laid-open Patent Application No. 2012-234894
Patent Document 8: Japanese Laid-open Patent Application No. 2004-352817
Patent Document 9: Japanese Laid-open Patent Application No. 2013-245320

SUMMARY OF THE INVENTION

Problems to be Solved by the Invention

The present invention aims to provide a thermosetting adhesive composition having a low dielectric constant, a low dielectric tangent, a high adhesive strength relative to a LCP film or a copper foil, a sufficiently high heat resistance to endure a rapid heating at a soldering process, and a sufficiently high flexibility to endure a folding, and a bonding sheet, a cover lay film, FRCC, and FCCL with adhesive agent, utilizing the adhesive composition.

Means to Solve the Problems

The present inventors have found that, in a thermosetting adhesive composition in which a vinyl compound having a polyphenylene ether skeleton represented by formula (1), a bismaleimide resin having two or more maleimide groups in the molecule thereof, and a polyolefin-based elastomer are combined, in the case where the ratio of vinyl groups and the maleimide groups in the composition and the proportion of the polyolefin-based elastomer in the composition are specific values, the thermosetting adhesive composition has a low dielectric constant, a low dielectric tangent, a high adhesive strength relative to a LCP film or a copper foil, a sufficiently high heat resistance to endure a soldering process, and a sufficiently high flexibility to endure a folding even after being cured by heating, and then the present invention has been completed.

In addition, the present invention relates to a bonding sheet in which the thermosetting adhesive composition is coated on one surface of a releasable film, a cover lay film in which the thermosetting adhesive composition is coated on one surface of a heat-resistant film, a double-sided adhesive tape in which the thermosetting adhesive composition is coated on both surfaces of a heat-resistant film, FRCC in which the thermosetting adhesive composition is coated on one surface of a copper foil, and FCCL with an adhesive agent in which the thermosetting adhesive composition is coated on one surface of a heat-resistant film and a copper foil is laminated on the other surface thereof.

The present invention involves the following aspects.
(1) A thermosetting adhesive composition containing: a component (A) that is a vinyl compound having a polyphenylene ether skeleton represented by formula (1); a component (B) that is a maleimide resin having at least two maleimide groups in a molecule thereof; and a component (C) that is a thermoplastic elastomer that is a copolymer of a polyolefin block and a polystyrene block containing a polyolefin skeleton as a main component thereof, wherein
the equivalent ratio of vinyl groups in the component (A) and the maleimide groups in the component (B) is 1.0:0.5 to 1.0:4.0,
the proportion of the component (C) in the total weight of the component (A), the component (B), and the component (C) is 55 to 95% by weight, and the ratio of styrene units of the component (C) with respect to the total weight of the component (C) is 10 to 40% by weight, the tensile stress at 100% elongation is 0.1 to 2.9 MPa, and the elongation at break is 100% or greater.

(1)

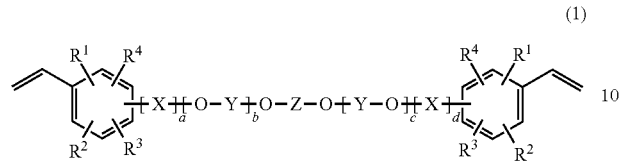

In the formula (1), substituents $R^1$, $R^2$, $R^3$, and $R^4$ each represent a hydrogen atom, a halogen atom, an alkyl group, a phenyl group, or a haloalkyl group, X represents an organic group having at least one carbon atom, and the organic group may contain an oxygen atom, a sulfur atom, or a halogen atom, a and d each represent 0 or 1, Y is presented by the following formula (2), b and c each represent an integer of 0 to 20, but b and c are not simultaneously 0, and Z is represented by the following formula (3).

(2)

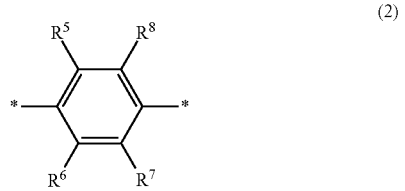

(3)

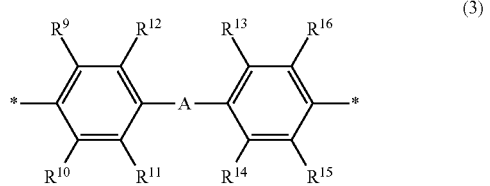

In the formulae, $R^5$, $R^6$, $R^7$, and $R^8$ each represent a hydrogen atom, a halogen atom, a C1-6 alkyl group, or a phenyl group, $R^9$, $R^{10}$, $R^{11}$, $R^{12}$, $R^{13}$, $R^{14}$, $R^{15}$, and $R^{16}$ each represent a hydrogen atom, a halogen atom, a C1-6 alkyl group, or a phenyl group, A represents a single bond, or a C1-20 linear, branched, or cyclic hydrocarbon group, and

* represents a binding site with an oxygen atom.

(2) The thermosetting adhesive composition according to (1) mentioned above, wherein the component (A) is represented by the following formula (4).

In the formula (4), b and c are defined in (1) mentioned above, Y satisfies a structure in which one of the following formulae (5) and (5') is arranged or two thereof are arranged at random. In the following formulae (5) and (5'), *¹ represents a binding site with an oxygen atom in the formula (4), and *² represents a binding site with a carbon atom in the formula (4).

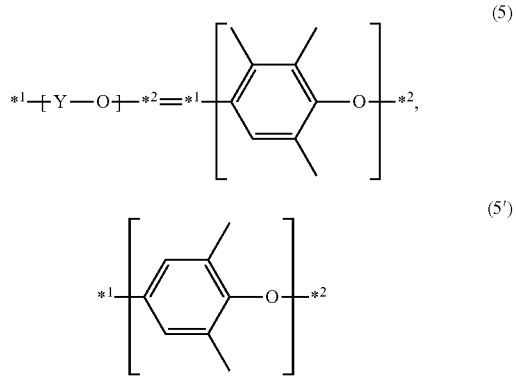

(5)

(5')

(3) The thermosetting adhesive composition according to (1) or (2) mentioned above, wherein the component (B) is at least one selected from the group consisting of compounds having structures represented by the following formulae (6) to (9).

(6)

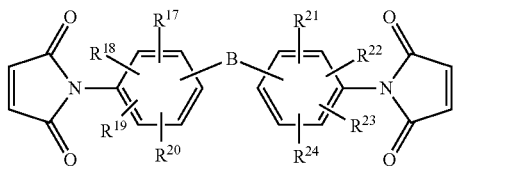

In the formula (6), $R^{17}$ to $R^{24}$ each represent a hydrogen atom or a C1-6 alkyl group, and B represent a single bond, a C1-20 divalent hydrocarbon group, or an oxygen atom.

(7)

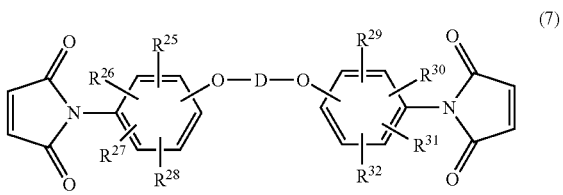

(4)

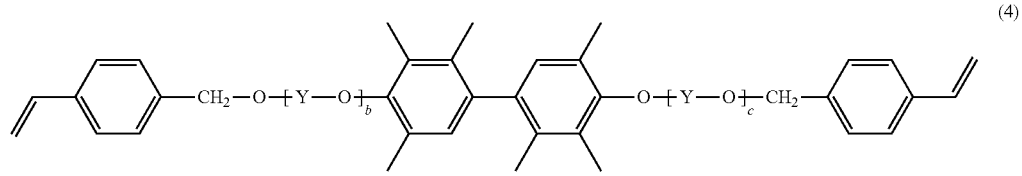

In the formula (7), $R^{25}$ to $R^{32}$ each represent a hydrogen atom or a C1-6 alkyl group, and D represents a C1-20 divalent hydrocarbon group.

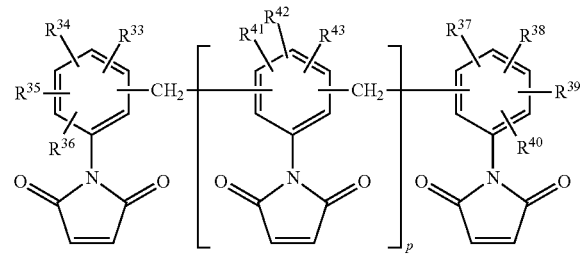
(8)

In the formula (8), $R^{33}$ to $R^{43}$ each represent a hydrogen atom or a C1-6 alkyl group, and p represents an integer of 1 to 20.

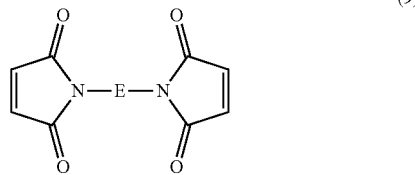
(9)

In the formula (9), E represents a C1-20 divalent aliphatic hydrocarbon group.

(4) The thermosetting adhesive composition according to any one of (1) to (3) mentioned above, wherein the component (C) is at least one selected from the group consisting of a polystyrene-poly(ethylene/propylene) block copolymer, a polystyrene-poly(ethylene/butylene) block copolymer, a polystyrene-polyisoprene block copolymer, a polystyrene-poly(butadiene/butylene) block copolymer, and a hydrogenated polystyrene-poly(isoprene/butadiene) block copolymer.

(5) The thermosetting adhesive composition according to any one of (1) to (4) mentioned above, further containing a component (D) that is a filler.

(6) The thermosetting adhesive composition according to any one of (1) to (5) mentioned above, wherein a storage modulus when the thermosetting adhesive composition is cured by being heated at a rate of 180° C./hour from 25 to 150° C. has a minimum value of $1 \times 10^5$ Pa or more and a maximum value of $1 \times 10^8$ Pa or less.

(7) A thermosetting adhesive film including a releasable film substrate or a releasable paper substrate, and a thermosetting adhesive composition according to any one of (1) to (6) provided thereon.

(8) A substrate-laminating thermosetting adhesive film including a copper foil substrate and a thermosetting adhesive composition according to any one of (1) to (6) provided on one surface of the copper foil.

(9) A substrate-laminating thermosetting adhesive film including a heat-resistant film substrate and a thermosetting adhesive composition according to any one of (1) to (6) provided on at least one surface of the heat-resistant film substrate.

(10) A substrate-laminating thermosetting adhesive film including a heat-resistant film substrate, a thermosetting adhesive composition according to any one of (1) to (6) provided on one surface thereof, and a copper foil layer provided on the other surface thereof.

(11) The substrate-laminating thermosetting adhesive film according to (9) or (10) mentioned above, wherein the heat-resistant film substrate is a liquid crystal polymer film.

(12) A film obtained by curing a thermosetting resin film of (7) mentioned above.

(13) A film obtained by curing a substrate-laminating thermosetting resin film of any one of (8) to (11) mentioned above.

(14) A composite film including at least one substrate selected from the group consisting of a copper foil, a heat-resistant film, and a laminate film of both a copper foil and a heat-resistant film, and at least one thermosetting adhesive film selected from the group consisting of the thermosetting adhesive film of (7) and the substrate-laminating thermosetting adhesive film of any one of (8) to (10), wherein at least one sheet of the at least one substrate and at least one sheet of the at least one thermosetting adhesive film are laminated together.

Effects of the Invention

The thermosetting adhesive composition according to the present invention has a low dielectric constant and a low dielectric tangent, exhibits a high adhesive strength relative to a LCP film or a copper foil, has a sufficiently high heat resistance to endure a rapid heating at a soldering process and a sufficiently high flexibility to endure a folding, and is suitable as an adhesive raw material of FPC with LCP film, specifically, as an adhesive raw material of a bonding sheet, a cover lay film, FRCC, or FCCL with adhesive agent.

EMBODIMENTS FOR CARRYING OUT THE INVENTION

Although the present invention will be explained below in detail, the present invention should not be interpreted exclusively on specific embodiments described in the present specification.

A thermosetting adhesive composition (hereinafter, appropriately abbreviated as an adhesive composition) contains as essential components a component (A) that is a vinyl compound in which a terminal end of a bifunctional polyphenylene ether oligomer is converted to a vinyl group, a component (B) that is a bismaleimide resin having at least two maleimide groups in a molecule thereof, and a component (C) that is a polyolefin-based elastomer.

<Component (A): Vinyl Compound>

The component (A) according to the present invention is a vinyl compound having a polyphenylene ether skeleton represented by formula (1). The component (A) according to the present invention mainly contributes in thermosetting properties and improvement in the heat-resistant and low dielectric properties.

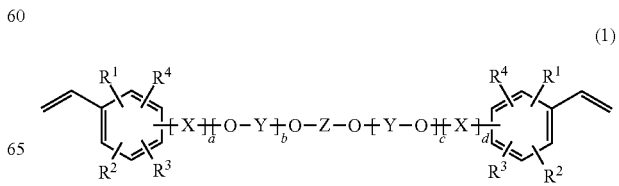
(1)

-continued

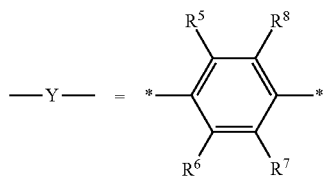
(2)

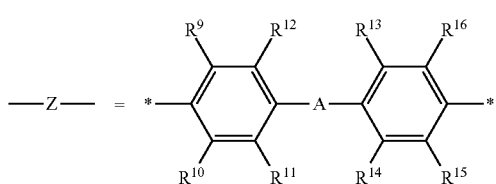
(3)

In the formula (1), substituents $R^1$, $R^2$, $R^3$, and $R^4$ each represent a hydrogen atom, a halogen atom, an alkyl group, a phenyl group, or a haloalkyl group.

Examples of the halogen atom include a fluorine atom, a chlorine atom, a bromine atom, and an iodine atom.

The alkyl group is preferably a C1-6 alkyl group.

The haloalkyl group is preferably C1-6 haloalkyl group.

Among these, the substituents $R^1$, $R^2$, $R^3$, and $R^4$ each preferably represent a hydrogen atom or a C1-6 alkyl group.

X is an organic group having at least one carbon atom and may have an oxygen atom, a sulfur atom, or a halogen atom, and a and d represent 0 or 1.

The organic group having at least one carbon atom is preferably a C1-6 alkyl group.

Y is represented by formula (2), and $R^5$, $R^6$, $R^7$, and $R^8$ each represent a hydrogen atom, a halogen atom, a C1-6 alkyl group, or a phenyl group, and preferably represent a hydrogen atom or a C1-6 alkyl group.

b and c represent an integer of 0 to 20, but b and c are not simultaneously 0.

Z is represented by formula (3), and $R^9$, $R^{10}$, $R^{11}$, $R^{12}$, $R^{13}$, $R^{14}$, $R^{15}$, and $R^{16}$ each represent a hydrogen atom, a halogen atom, a C1-6 alkyl group, or a phenyl group, and preferably represent a hydrogen atom or a C1-6 alkyl group.

A in formula (3) represents a single bond or a C1-20 linear, branched, or cyclic hydrocarbon group, and preferably represents a single bond or a C1-6 divalent aliphatic saturated hydrocarbon group.

"*" in the formulae (2) and (3) each represent binding sites with oxygen atoms in the formula (1).

In a preferable aspect, the component (A) has a structure represented by the following formula (4).

In the formula (4), b and c represent the same as mentioned above.

In the formula (4), Y satisfies a structure in which one of the formulae (5) and (5') is arranged or two thereof are arranged at random. In the formulae (5) and (5'), *[1] represents a binding site with an oxygen atom in the formula (4), and *[2] represents a binding site with a carbon atom in the formula (4).

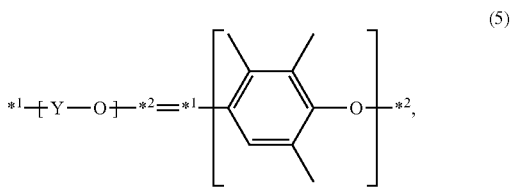
(5)

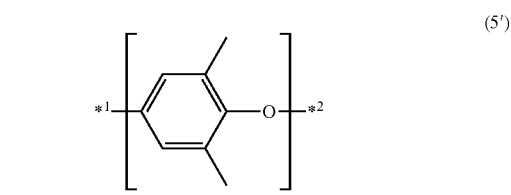
(5')

The phrase "Y satisfies a structure in which one of the formulae (5) and (5') is arranged or two thereof are arranged at random" encompasses not only an embodiment in which —YO— in the formula (4) has a structure in which only one of the formulae (5) and (5') is arranged or two thereof are arranged at random, but also an embodiment in which —OY— has a structure in which only one of the formulae (5a) and (5'a) is arranged or two thereof are arranged at random. In the formulae (5a) and (5a'), *[1] represents a binding site with an oxygen atom in the formula (4) and *[2] represents a binding site with a carbon atom in the formula (4).

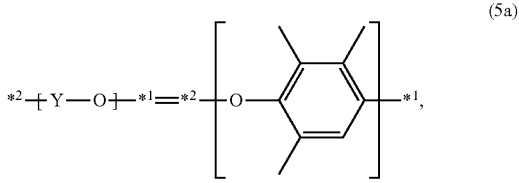
(5a)

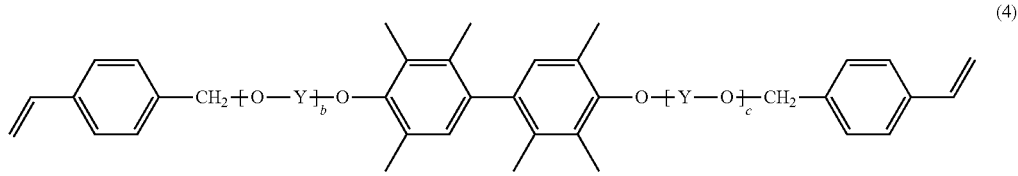
(4)

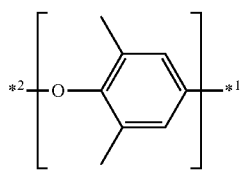

[Molecular Weight of Component (A)]

The number average molecular weight of the compound represented by formula (1) is preferably within a range of 500 to 3000, and more preferably 1000 to 2500. The number average molecular weight is determined by gel permeation chromatography using polystyrene as standards.

The number average molecular weight of 500 or more is preferable, because the excessive decrease in the viscosity of the adhesive composition and the outflow of the adhesive composition at the step of curing the resin composition are suppressed. The component (A) having a number average molecular weight of 500 or more is preferable, because the excessive decrease in the vinyl group equivalent is prevented, the required amount of the component (B) determined based on the reaction base is low, and the low dielectric properties are easily obtained.

On the other hand, the number average molecular weight of 3000 or less is preferable, because the solubility in a solvent and the compatibility with another resin are improved, the stability of the varnish is favorable, and the deterioration of the appearance and physical properties when formed into a film are suppressed.

<Component (B): Maleimide Resin>

The component (B) according to the present invention is a maleimide compound having at least two maleimide groups in a molecule thereof, and preferably at least one selected from the group consisting of compounds represented by formulae (6) to (9). In the present invention, the component (B) mainly contributes the thermosetting properties of the adhesive composition. Although the component (A) and the component (B) are solely cured by being heated at 200° C. or higher, the reaction temperature can be decreased by making both the component (A) and the component (B) coexistent, and specifically favorable properties are obtained by conducting heating treatment at 150° C. to 180° C.

In the adhesive composition according to the present invention, one of the compounds represented by formulae (6) to (9) may be solely contained, or at least two thereof may be contained in combination.

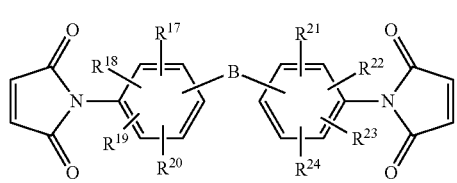

In the formula (6), $R^{17}$ to $R^{24}$ each represent a hydrogen atom or a C1-6 alkyl group. B represents a single bond, a C1-20 divalent hydrocarbon group, or an oxygen atom, and preferably represents a C1-4 divalent aliphatic saturated hydrocarbon group.

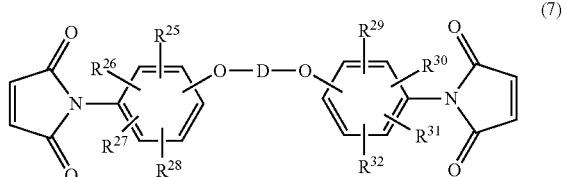

In the formula (7), $R^{25}$ to R32 each represent a hydrogen atom or a C1-6 alkyl group. D represents a C1-20 divalent hydrocarbon group, and preferably represents a hydrocarbon group represented by formula (15).

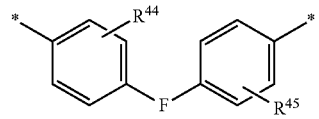

In the formula (15), $R^{44}$ and $R^{45}$ each represent a hydrogen atom or a C1-4 alkyl group, F represents a C1-4 divalent aliphatic saturated hydrocarbon group, and * represents a binding site with an oxygen atom.

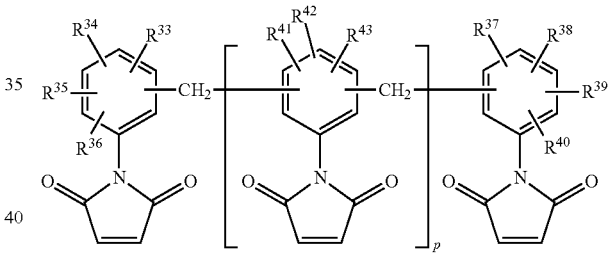

In the formula (8), $R^{33}$ to $R^{43}$ each represent a hydrogen atom or a C1-6 alkyl group, and p represents an integer of 1 to 20.

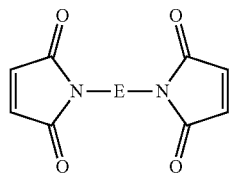

In the formula (9), E represents a C1-20 divalent aliphatic hydrocarbon group, and preferably a C1-10 divalent aliphatic saturated hydrocarbon group.

Specific examples of the formulae (6), (7), (8), and (9) include the following formulae (10), (11), (12), (13), and (14). In the following formula (13), p means the same as p in the formula (8).

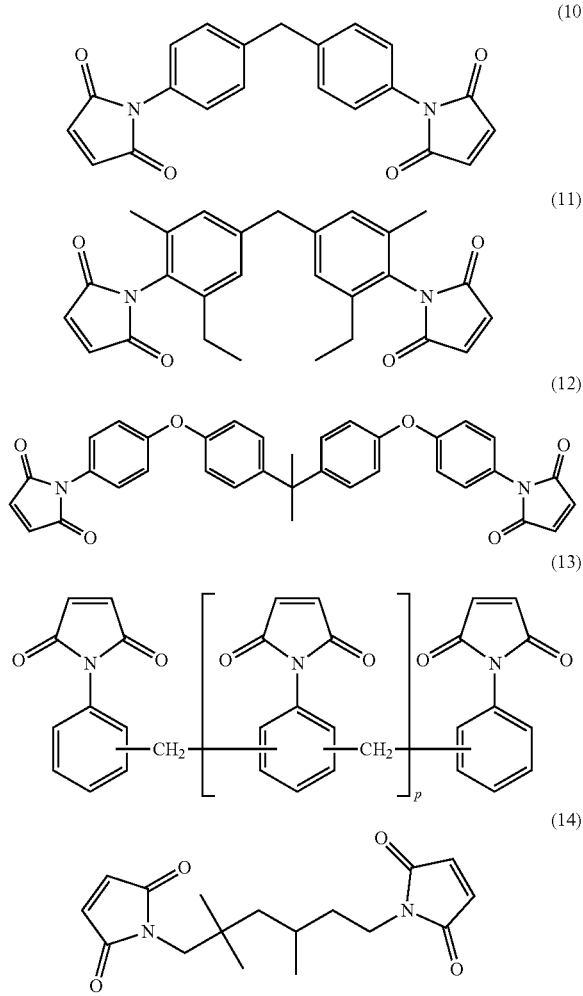

[Ratio of Vinyl Groups and Maleimide Groups]

The formulation amounts of the component (A) and the component (B) are determined taking into account of the equivalent ratio of vinyl groups and maleimide groups. That is, the equivalent ratio of vinyl groups contained in the component (A) and maleimide groups contained in the component (B) (vinyl group:maleimide group) is set to be 1.0:0.5 to 1.0:4.0, preferably 1.0:0.75 to 1.0 to 3.5, and more preferably 1.0:1.0 to 1.0:3.0.

The ratio of maleimide groups lower than 1.0:0.5 is not preferable, because the unreacted component (A) having a low molecular weight remains in the cured adhesive composition, and the mechanical properties of the adhesive composition at a high temperature are deteriorated. On the other hand, the ratio of maleimide groups higher than 1.0:5.0 is not preferable, because the amount of the component (B) in the adhesive composition increases, the component (B) having a higher dielectric constant, a higher dielectric tangent, and a higher moisture absorptivity in comparison with the component (A), and thereby deteriorating the electric properties of the adhesive composition and the heat-resistance at a soldering process at a time of moisture absorption.

<Component (C): Thermoplastic Elastomer>

The component (C) according to the present invention mainly contributes to the low dielectric properties, the improvement of the heat-resistance and the adhesiveness of the adhesive composition, and the improvement of the flexibilities when the adhesive composition is made into a film.

A thermoplastic elastomer that is a copolymer of a polyolefin block and a polystyrene block, having a polyolefin skeleton composed of one or two or more selected from the group consisting of ethylene, propylene, butene, isobutene, butadiene, and isoprene as the main component thereof (hereinafter, abbreviated as a thermoplastic elastomer) may be used as the component (C) according to the present invention.

Specifically, a polystyrene-poly(ethylene/propylene) block copolymer, a polystyrene-poly(ethylene/butylene) block copolymer, a polystyrene-polyisoprene block copolymer, a polystyrene-poly(butadiene/butylene) block copolymer, and a hydrogenated polystyrene-poly(isoprene/butadiene) block copolymer are more preferable, and a polystyrene-poly(ethylene/propylene) block copolymer and a polystyrene-polyisoprene block copolymer are particularly preferable.

The weight ratio of styrene units in the thermoplastic elastomer used in the present invention (hereinafter, abbreviated as styrene content), relative to the total weight of the thermoplastic elastomer, is 10 to 40% by weight, preferably 10 to 30% by weight, and even more preferably 10 to 25% by weight. The styrene content of less than 10% by weight is not preferable, because the compatibility with another resin is deteriorated. The styrene content of higher than 40% by weight is not preferable, because cracks easily generate when the adhesive composition is made into a film, and the storage modulus E' of the adhesive composition after being cured by heating increases, and thereby deteriorating the flexibilities which results in the deterioration of the folding endurance.

The thermoplastic elastomer used in the present invention has predetermined values of the tensile stress at 100% elongation and the elongation at break determined in accordance with JIS K-6251. The details thereof are described below. The tensile stress at 100% elongation is within a range of 0.1 to 2.9 MPa, preferably within a range of 0.2 to 2.7 MPa, and more preferably 0.3 to 2.5 MPa. The tensile stress at 100% elongation of less than 0.1 MPa is not preferable, because the adhesive composition after being cured is too flexible to provide the strength required as an adhesive agent. The tensile stress at 100% elongation of more than 2.9 MPa is not preferable, because the adhesive composition after being cured is so rigid that the stress relaxation properties thereof is deteriorated, that is, a small displacement amount is likely to generate a large stress.

The elongation at break is 100% or greater, more preferably 200% or more, even more preferably 300% or more, and particularly preferably 400% or more. The elongation at break of less than 100% is not preferable, because the flexibilities of the adhesive composition are insufficient, cracks are likely to generate in a thermosetting adhesive film (hereinafter, appropriately abbreviated as "adhesive film") in which the adhesive composition is provided on another substrate, and the folding endurance thereof is deteriorated.

Although the number average molecular weight of the thermoplastic elastomer used in the present invention is not particularly limited, the number average molecular weight is preferably 10,000 to 300,000, more preferably 10,000 to 250,000, and particularly preferably 10,000 to 200,000, in terms of decreasing of the storage modulus E' of the adhesive composition and realizing high flexibilities. The thermoplastic elastomer having a number average molecular weight of 10,000 or more makes the flexibilities of the adhesive composition appropriate, and realizes a strength required as an adhesive agent. On the other hand, the thermoplastic elastomer having a number average molecular weight of 300,000 or less suppresses the increase in the storage modulus E' of the adhesive composition, thereby preventing the deterioration of flexibilities and suppressing the decrease in the folding endurance of the adhesive composition, and maintains the solvent solubility and the compatibility with other components, thereby suppressing the generation of phase separation. One kind of the elastomer may be solely used, or at least two kinds thereof may be used in combination, in the adhesive composition according to the present invention.

[Proportion of Component (C)]

The proportion of the component (C) in the total weight of the components (A), (B), and (C) of the adhesive composition according to the present invention is 55 to 95% by weight, preferably 60 to 95% by weight, more preferably 70 to 95% by weight, and particularly preferably 75 to 95% by weight.

In the case where the proportion of the component (C) is 55% by weight or more, the separation of each of the components is suppressed in an adhesive composition solution, and cracking of a film is suppressed when formed into a film. In addition, the above-mentioned composition is preferably used as an adhesive agent of FPC, since the high peel strength relative to a LCP film or a copper foil is exhibited. On the other hand, in the case where the proportion of the component (C) is 95% by weight or less, an appropriate curability is obtained, and the insufficiency of the mechanical properties of the adhesive composition after being cured is suppressed, and therefore the composition is suitable for practical use.

[Elastic Modulus after Curing]

The storage modulus after heating the adhesive composition according to the present invention at 180° C./1 hour within a range of 25 to 150° C. preferably has a minimum value of $1 \times 10^5$ Pa or more and a maximum value of $1 \times 10^8$ Pa or less, more preferably has a minimum value of $2 \times 10^5$ Pa or more and a maximum value of $1 \times 10^8$ Pa or less, and even more preferably has a minimum value of $3 \times 10^5$ Pa or more and a maximum value of $1 \times 10^8$ Pa or less. The storage modulus is measured using a dynamic viscoelasticity measuring apparatus at a measurement frequency of 11 Hz, and a measurement temperature of 25° C. to 150° C., while raising the temperature at 10° C. /minute.

In the case where the storage modulus is $1 \times 10^5$ Pa or more, an appropriate flexibility is realized, the handling is easy, and the mechanical strength required as an adhesive raw material of FPC is ensured. In addition, the significant flexibilization at a soldering step can be further prevented. On the other hand, in the case where the storage modulus is $1 \times 10^8$ Pa or less, the flexibilities of the adhesive composition after being cured is further ensured, and more suitable folding endurance is ensured. In addition, the adhesiveness against a LCP film is further improved.

<Filler>

A filler may be included in the adhesive composition according to the present invention so as to improve the mechanical strength, control the melting behavior, suppress the generation of the surface tuck, improve the coating properties, the adhesiveness of a conductive paste, and the flame resistance, control the dielectric properties, or the like. Examples of the filler include resin particles, inorganic particles, and inorganic fibers and a conventional filler may be used.

Specific examples of the filler include: resin particles such as an acrylic resin, a polystyrene resin, a styrene-acrylic copolymer, a polyethylene resin, an epoxy resin, a silicone resin, a polyvinylidene fluoride, a polytetrafluoroethylene, a divinylbenzene resin, a phenol resin, an urethane resin, a cellulose acetate, a nylon, a cellulose, a benzoguanamine resin, and a melamine resin; inorganic particles such as metal salts such as silica, titanium oxide, aluminum oxide, zinc oxide, magnesium oxide, silicon carbide, silicon nitride, boron nitride, barium sulfate, magnesium sulfate, aluminium hydroxide, magnesium hydroxide, and boron nitride, kaolin, clay, talc, zinc oxide, white lead, zeeklite, quartz, diatomaceous earth, pearlite, bentonite, mica, and synthetic mica; and fiber fillers such as glass fibers, aramid fibers, silicon carbide fibers, and alumina fibers.

It is effective to use Silas Balloons or nanosized hollow silica, which are inorganic particles, in order to avoid impairing the low dielectric constant and low dielectric tangent characteristics, which are characteristics of the adhesive composition according to the present invention.

One kind of the filler may be solely used, or at least two kinds thereof may be used in combination. It is preferable that the formulated amount thereof, with respect to 100 parts by volume of the total volume of the adhesive composition, be 0.1 to 200 parts by volume, more preferably 0.5 to 150 parts by volume, and even more preferably 1 to 100 parts by volume.

<Other Additives>

Known flame retardants, reaction accelerators, crosslinking agents, polymerization inhibitors, coupling agents, thermosetting resins, thermoplastic resins, dyes, pigments, thickeners, lubricants, antifoaming agents, ultraviolet absorbers, or the like may be added, as needed, in the adhesive composition according to the present invention so as to adjust various characteristics.

It is preferable that an epoxy resin be absent in the adhesive composition according to the present invention from the standpoint of improvement in the resistance to soldering heat of the adhesive film.

<Method for Preparing an Adhesive Composition Solution>

A solution of the adhesive composition according to the present invention will be explained below. The solution of the adhesive composition according to the present invention may be prepared by dissolving or dispersing the components (A), (B), and (C) and other raw materials of the adhesive composition according to the present invention in a solvent.

Each of the components of the adhesive composition may be dissolved in solvents separately, followed by formulating the predetermined amounts of each of the solutions, respectively, or each of the components as raw materials of the adhesive composition may be mixed in advance, followed by adding the predetermined amount of a solvent to the mixture, and then dissolving the mixture therein.

Examples of the dissolving method include a method in which the adhesive composition and the solvent are put in a container equipped with a stirrer, and then the mixture is stirred. It is effective to conduct a heating treatment so as to shorten the dissolution time period.

It is desirable that the solid content in the solution of the adhesive composition according to the present invention be set to be within a range of 10 to 50% by weight, and preferably 15 to 40% by weight. In the case where the solid content is 10% by weight or more, there is a tendency in which the excessive decrease in the viscosity of the adhesive composition solution is avoided and a film having a desired thickness and shape is easily formed without generating outflow of the solution when coated on a substrate film, for example. On the other hand, in the case where the solid content is 50% by weight or less, there is a tendency in which the excessive increase in the viscosity of the adhesive composition solution is avoided, a coating work is easier, the separation or crystallization of each components is avoided, and the storage stability of the adhesive composition solution is improved.

The solvent available in the present invention is not particularly limited, provided that the adhesive composition can be dissolved in the solvent, and a solvent in which the adhesive composition cannot be dissolved may also be used, if the solvent can realize uniform dispersion. Specific examples thereof include acetone, methyl ethyl ketone, methyl isobutyl ketone, cyclohexanone, cyclopentanone, toluene, xylene, ethyl acetate, butyl acetate, tetrahydrofuran, N, N-dimethylformamide, N, N-dimethylacetamide, N-methyl-2-pyrrolidone, dimethyl sulfoxide, ethylene glycol monomethyl ether acetate, propylene glycol dimethyl ether, benzene dioxane, cyclopentyl methyl ether, methylene chloride, chloroform, 1,2-dichloroethane, γ-butyrolactone, cellosolve, butyl cellosolve, carbitol, and butyl carbitol. One kind of the solvent may be solely used, or at least two kinds thereof may be used in combination. Among these, tetrahydrofuran and toluene are preferably used.

<Method for Coating an Adhesive Composition Solution>

Next, the method for preparing a substrate-laminating adhesive film in which the adhesive composition according to the present invention is provided on a substrate such as a plastic film, a metal foil, a paper, a woven fabric, a nonwoven fabric, or the like, will be explained below. In addition, a plastic film, a metal foil, a paper, a woven fabric, a nonwoven fabric, or the like, having one surface or both surfaces subjected to release treatment is also referred to as a substrate in the present invention.

The substrate-laminating adhesive film according to the present invention may be prepared by coating the adhesive composition solution on the substrate, followed by drying the resultant, or an adhesive film may be formed on a releasable film or a releasable paper in advance, followed by binding the resultant with a substrate.

Examples of a method for coating the adhesive composition solution include ordinary coating methods and printing methods. Specific examples thereof include: coatings such as air doctor coating, bar coating, blade coating, knife coating, reverse coating, transfer roll coating, gravure roll coating, kiss coating, cast coating, spray coating, slot orifice coating, calendar coating, dam coating, dip coating, and die coating; and printings such as intaglio printings such as gravure printing, and stencil printings such as screen printing.

Although drying conditions for drying the solvent are not particularly limited, it is preferable that drying be conducted at a temperature appropriately adjusted depending on the used solvent within a range of 60 to 150° C. Drying temperature of lower than 60° C. is not preferable, because the solvent tends to remain in an adhesive film, and there is a case in which the temperature of the coated adhesive composition solution lowers in association with the volatilization of the solvent, thereby causing dew condensation and phase separation or precipitation of the resin component. Drying temperature of higher than 150° C. is not preferable, because the curing of the adhesive composition proceeds or the rapid temperature increase makes the coating film rough.

Although drying time is also not particularly limited, it is preferable that the drying time be 1 to 10 minutes in consideration of the practicality.

The thickness of the adhesive film may be adjusted by the concentration of the adhesive composition solution and the coating thickness thereof.

A releasable film or a releasable paper may be laminated as a separator (protective layer) on the adhesive film after being dried. Any ones may be used as the releasable film or the releasable paper, provided that characteristics of the adhesive film are not impaired and easy peel-off can be realized. Specific examples thereof include a polyethylene film, a polypropylene film, a polymethylpentene film, a polyethylene terephthalate film subjected to release-treatment using silicone or the like, a polyethylene-coated paper, a polypropylene-coated paper, and a silicone releasable paper. In the case of the releasable film utilizing a plastic film as a base material thereof, the thickness of the separator is preferably 10 to 100 μm, whilst in the case of the releasable paper utilizing a paper as a base material thereof the thickness of the separator is preferably 50 to 200 μm.

In the case where a substrate-laminating adhesive film having a separator is used, the separator is solely separated therefrom, and then the adhesive film surface is affixed on an adherend.

Examples of the form of the substrate-laminating adhesive film include a sheet and a roll. It is preferable from the standpoint of the productivity that an adhesive composition solution be continuously applied on a substrate wound into a roll state using a known coating apparatus or the like, the substrate coated with the adhesive composition solution be made to pass through a drying furnace to be dried at 60 to 150° C. for 1 to 10 minutes, a protective layer be affixed thereon using a roll laminator when the substrate exits from the drying furnace to form a substrate-laminating adhesive film, and then the substrate-laminating adhesive film be wound into a roll state to be stored.

<Method for Curing an Adhesive Composition>

A cured product is obtained by heating the adhesive composition according to the present invention at 150 to 180° C. The heating time period is 20 minutes to 5 hours, and preferably 30 minutes to 2 hours.

The heating method is arbitrary, and a hot air circulating oven, a press machine, an autoclave, or the like may be used, for example. The cured product of the adhesive composition according to the present invention is characterized by having high flexibilities even at a low temperature and exhibiting small decrease in the elastic modulus even at a high temperature. Specifically, the storage modulus after heating treatment is conducted at 180° C./1 hour within a range of 25 to 150° C. has a minimum value of $1 \times 10^5$ Pa or more and a maximum value of $1 \times 10^8$ Pa or less.

<Applications>

The thermosetting adhesive composition according to the present invention is provided on a substrate to form an adhesive film, and the adhesive film may be used for various components of FPC. Each application embodiments will be explained below.

[Bonding Sheet]

A bonding sheet may be referred to as a thermosetting adhesive film in which the thermosetting adhesive composition according to the present invention is provided on a releasable film substrate.

Among the substrate-laminating adhesive films according to the present invention, those using a releasable film having a substrate utilizing a plastic film as a base material or a releasable paper having a substrate utilizing a paper as a base material may be used as bonding sheets. Although there is no particular limitation on a substrate used in the bonding sheet, a releasable film having a thickness of 10 to 100 μm or a releasable paper having a thickness of 50 to 200 μm is preferable.

Specific examples of the releasable film include a polyethylene film, a polypropylene film, a polymethylpentene film, a polyvinyl chloride film, a release-treated polyethylene terephthalate film, and a release-treated polyethylene naphthalate film. Specific examples of the releasable paper include a polyethylene-coated paper, a polypropylene-coated paper, and silicone releasable paper.

In the case of the bonding sheet, although the thickness of the adhesive film may be arbitrarily set, the thickness thereof in a dry state is preferably 5 to 50 μm, and more preferably 5 to 25 μm.

[Adhesive Film with Copper Foil (FRCC)]

Among the substrate-laminating adhesive films according to the present invention, those utilizing a copper foil as a substrate may be used as FRCC. That is, FRCC may be referred to as a thermosetting adhesive tape in which the thermosetting adhesive composition according to the present invention is provided on one surface of a copper foil.

Although there is no particular limitation on the copper foil used for FRCC, copper foils commercially available for electronic raw material part applications. The thickness of the copper foil is preferably 5 to 50 μm, and more preferably 9 to 25 μm.

In the case where the substrate-laminating adhesive film is used for FRCC, although the thickness of the adhesive film may be arbitrarily set, the thickness thereof in a dry state is preferably 1 to 50 μm, and more preferably 1 to 25 μm.

[Cover Lay Film]

Among the substrate-laminating adhesive films according to the present invention, those utilizing a heat-resistant plastic film as a substrate may be used as a cover lay film.

There is no particular limitation on the heat-resistant film used for the cover lay film, provided that the heat-resistant film has high electric insulating properties, and is commonly employed in the cover lay film. Specific examples thereof include a polyimide film, a polyethylene terephthalate film, a polyethylene naphthalate film, a polybutylene terephthalate film, a polyparabanic acid film, a polyetheretherketone film, a polyphenylene sulfide film, a liquid crystal polymer film, a syndiotactic polystyrene film, and a polycarbonate film, and a liquid crystal polymer (LCP) film is more preferable.

Although the thickness of the heat-resistant film may be arbitrarily set depending on the intended purpose, the thickness is generally 1 to 50 μm, preferably 3 to 38 μm, and particularly preferably 5 to 25 μm. The surface of the heat-resistant film may be treated with a chemical solution, or subjected to surface modification treatment such as plasma treatment, corona discharge treatment, or sandblasting treatment, so as to increase the adhesive strength thereof relative to the adhesive composition.

In the case where the substrate-laminating adhesive film is used as a cover lay film, although the thickness of the adhesive film may be arbitrarily set, the thickness thereof in a dry state is preferably 5 to 50 μm, more preferably 5 to 38 μm, and particularly preferably 5 to 25 μm.

[FCCL with an Adhesive Agent]

The substrate-laminating thermosetting adhesive film according to the present invention include: a heat-resistant film substrate; a thermosetting adhesive composition provided on one surface thereof; and a copper foil layer laminated on the other surface thereof. An FCCL with an adhesive agent in which the adhesive film according to the present invention, a heat-resistant film, and a copper foil are sequentially laminated has a structure in which a bonding sheet is laminated on the heat-resistant film surface of the FCCL in advance. The use of the FCCL with an adhesive agent realizes labor-saving and cost reduction of FPC production processes.

As the copper foil and the heat-resistant film used in the FCCL with an adhesive agent according to the present invention, the same ones as those exemplified in the cover lay film and FRCC may be used. As the FCCL, commercially available ones may be used in the present invention. Alternatively, the FCCL may be prepared by pasting a copper foil and a heat-resistant film using the adhesive film according to the present invention.

The thickness of the copper foil is 5 to 50 μm, and preferably 9 to 25 μm, and the thickness of the heat-resistant film is 1 to 50 μm, preferably 3 to 38 μm, and more preferably 5 to 25 μm. Although the thickness of the adhesive film may be arbitrarily set, the thickness thereof in a dry state is preferably 1 to 50 μm, and more preferably 1 to 25 μm.

In the case where a LCP film is used as a heat-resistant film of the cover lay film or the substrate-laminating adhesive film in which the adhesive film, the heat-resistant film, and the copper foil are sequentially laminated, a FPC raw material having a lower dielectric constant and a lower dielectric tangent is obtained.

<Characteristics of the Present Invention>

The adhesive composition according to the present invention has properties particularly suitable for use as a high-frequency FPC raw material, that is, a bonding sheet, a cover lay, a FRCC, or a FCCL with an adhesive agent, as shown below. The adhesive composition according to the present invention exhibits excellent electrical properties, adhesive strength, heat-resistant properties, and flexibilities by being heated at 150 to 180° C. for 30 minutes to 1 hour.

Specifically, the dielectric constant (E) at a frequency of 10 GHz is 3.0 or less, the dielectric tangent (tan δ) is 0.005 or less, the peel strength with respect to a LPC film or a copper foil is 4 N/cm or more, abnormality is absent in a solder float test of a laminated structure with a LCP film and a copper foil at 300° C. for 60 seconds, and the folding endurance number of a laminated structure with a copper foil is five times or more.

EXAMPLES

Hereinafter, although the present invention will be explained in detail referring to examples and comparative examples, the present invention is not limited to these.

Preparation of Adhesive Composition Solutions (1) Preparation Method 1: [Examples 1 to 18, Comparative Examples 1 to 6]

Components and a solvent, which were raw materials of adhesive compositions shown in Tables 1 to 4, were put into flasks, a thermometer and a stirrer were set in each of the flasks, and then the mixtures were stirred for 2 hours to dissolve all components, respectively. Finally, the resultant solutions were filtered using nylon meshes (wire diameter of 30 μm, 225 mesh) to obtain each adhesive composition solutions. Each of the liquid temperature was controlled so as not to exceed 30° C. during working.

(2) Preparation Example 2: [Example 19 (with Filler)]

A filler as Component (D) and a solvent shown in Tables 1 to 4 were put into glass flasks, and the filler was dispersed using an ultrasonic cleaning apparatus.

Components other than the filler and the solvent were added to the flasks, a thermometer and a stirrer were set in each of the flasks, and the mixtures were stirred for 2 hours to dissolve each components.

Finally, the resultant solutions were filtered using nylon meshes (wire diameter of 30 μm, 225 mesh) to obtain each adhesive composition solutions. Each of the liquid temperature was controlled so as not to exceed 30° C. during working.

TABLE 1

Chenges in physical properties due to the physical property of Component (C)

| | | Ex. 1 | Ex. 2 | Ex. 3 | Ex. 4 | Ex. 5 | Ex. 6 | C. Ex. 1 | C. Ex. 2 |
|---|---|---|---|---|---|---|---|---|---|
| Componet (A) vinyl group number:Component (B) maleimide group number | | 1.0:2.0 | 1.0:2.0 | 1.0:2.0 | 1.0:2.0 | 1.0:2.0 | 1.0:2.0 | 1.0:2.0 | 1.0:2.0 |
| Component A | Vinyl compound 1 | 16.4 | 16.4 | 16.4 | 16.4 | 16.4 | 16.4 | 16.4 | 16.4 |
| | Vinyl compound 2 | | | | | | | | |
| Component B | BMI1 | | | | | | | | |
| | BMI2 | 8.6 | 8.6 | 8.6 | 8.6 | 8.6 | 8.6 | 8.6 | 8.6 |
| | BMI3 | | | | | | | | |
| | BMI4 | | | | | | | | |
| Component C | Elastomer 1 | 75.0 | | | | | | | |
| | Elastomer 2 | | | | | | | 75.0 | |
| | Elastomer 3 | | 75.0 | | | | | | |
| | Elastomer 4 | | | | | | | | 75.0 |
| | Elastomer 5 | | | 75.0 | | | | | |
| | Elastomer 6 | | | | 75.0 | | | | |
| | Elastomer 7 | | | | | 75.0 | | | |
| | Elastomer 8 | | | | | | 75.0 | | |
| | Elastomer 9 | | | | | | | | |
| Component D | Aerosil RX200 | | | | | | | | |
| Other Components | NC3000H | | | | | | | | |
| | 2E4MZ | | | | | | | | |
| Solvent | THF | 400 | 340 | 300 | 340 | 300 | 340 | 570 | 400 |
| Film property | | ○ | ○ | ○ | ○ | ○ | ○ | xCracked | xEasily-cracked |
| 90° peel strength (N/cm) | Peel test 1 (LCP) | 4.3 | 8.8 | 9.0 | 6.0 | 4.4 | 5.0 | — | — |
| | Peel test 2 (Cu) | 6.6 | 10.8 | 8.6 | 8.0 | 7.0 | 8.2 | — | — |
| Solder heat resistance test | Solder test 1 treatment 1 (LCP) | ○ | ○ | ○ | ○ | ○ | ○ | — | — |
| | treatment 2 | ○ | ○ | ○ | ○ | ○ | ○ | — | — |
| | Solder test 2 treatment 1 (Cu) | ○ | ○ | ○ | ○ | ○ | ○ | — | — |
| | treatment 2 | ○ | ○ | ○ | ○ | ○ | ○ | — | — |
| Seam-folding test (times) | | >5 | >5 | >5 | >5 | >5 | >5 | — | — |
| Dielectric properties (10 GHz) | Dielectric constant (ε) | 2.36 | 2.40 | 2.25 | 2.34 | 2.33 | 2.48 | — | — |
| | Dielectric tangent (tanδ) | 0.0023 | 0.0024 | 0.0022 | 0.0024 | 0.0024 | 0.0025 | — | — |
| Storage modulus (Pa) | Maximum value | 7.7E+06 | 4.1E+06 | 2.4E+07 | 4.9E+07 | 3.1E+07 | 1.7E+07 | — | — |
| | Minimum value | 4.4E+06 | 1.5E+06 | 1.4E+06 | 1.2E+06 | 1.2E+06 | 2.0E+06 | — | — |

TABLE 2

Changes in physical properteis due to the proportaion of Component (C)

| | | Ex. 7 | Ex. 8 | Ex. 9 | Ex. 10 | C. Ex. 3 | C. Ex. 4 |
|---|---|---|---|---|---|---|---|
| Proportion (%) of Component (C) relative to the total solid content | | 55.0 | 60.0 | 90.0 | 95.0 | 45.0 | 97.5 |
| Componet (A) vinyl group number:Component (B) maleimide group number | | 1.0:2.0 | 1.0:2.0 | 1.0:2.0 | 1.0:2.0 | 1.0:2.0 | 1.0:2.0 |
| Component A | Vinyl compound 1 | | | | | | |
| | Vinyl compound 2 | 29.6 | 26.2 | 6.6 | 3.3 | 16.4 | 1.7 |
| Component B | BMI1 | | | | | | |
| | BMI2 | 15.4 | 13.8 | 3.4 | 1.7 | 8.6 | 0.8 |
| | BMI3 | | | | | | |
| | BMI4 | | | | | | |
| Component C | Elastomer 1 | | | | | | |
| | Elastomer 2 | | | | | | |
| | Elastomer 3 | 55.0 | 60.0 | 90.0 | 95.0 | 45.0 | 97.5 |
| | Elastomer 4 | | | | | | |
| | Elastomer 5 | | | | | | |
| | Elastomer 7 | | | | | | |
| | Elastomer 8 | | | | | | |
| | Elastomer 9 | | | | | | |
| Component D | Aerosil RX200 | | | | | | |
| Other Components | NC3000H | | | | | | |
| | 2E4MZ | | | | | | |

TABLE 2-continued

Changes in physical properteis due to the proportaion of Component (C)

|  |  | Ex. 7 | Ex. 8 | Ex. 9 | Ex. 10 | C. Ex. 3 | C. Ex. 4 |
|---|---|---|---|---|---|---|---|
| Solvent | THF | 400 | 400 | 300 | 300 | 400 | 300 |
| Film property |  | ○ | ○ | ○ | ○ | xCracked | ○ |
| 90° peel strength | Peel test 1 (LCP) | 4.4 | 4.6 | 10.0 | 9.8 | — | 7.8 |
| (N/cm) | Peel test 2 (Cu) | 4.9 | 4.9 | 11.9 | 11.0 | — | 7.4 |
| Solder heat | Solder test 1  treatment 1 | ○ | ○ | ○ | ○ | — | ○ |
| resistance test | (LCP)             treatment 2 | ○ | ○ | ○ | ○ | — | xSwollen |
|  | Solder test 2  treatment 1 | ○ | ○ | ○ | ○ | — | ○ |
|  | (Cu)             treatment 2 | ○ | ○ | ○ | ○ | — | xSwollen |
| Seam-folding test (times) |  | >5 | >5 | >5 | >5 | — | >5 |
| Dielectric properties | Dielectric constant (ε) | 2.47 | 2.45 | 2.34 | 2.33 | — | 2.32 |
| (10 GHz) | Dielectric tangent (tanδ) | 0.0036 | 0.0033 | 0.0014 | 0.0011 | — | 0.0009 |
| Storage modulus | Maximum value | 2.4E+07 | 2.1E+07 | 2.9E+06 | 2.5E+06 | — | 2.3E+06 |
| (Pa) | Minimum value | 1.1E+07 | 7.0E+06 | 9.2E+05 | 9.8E+05 | — | 9.1E+05 |

TABLE 3

Changes in physical properties due to the ratio of Component
(A) vinyl goup number:Component (B) maleimide group number

|  |  | EX. 11 | Ex. 12 | Ex. 13 | Ex. 14 | C. Ex. 5 | C. Ex. 6 |
|---|---|---|---|---|---|---|---|
| Componet (A) vinyl group number:Component (B) maleimide group number |  | 1.0:0.5 | 1.0:1.0 | 1.0:3.0 | 1.0:4.0 | 1.0:0.25 | 1.0:5.0 |
| Component A | Vinyl compound 1 |  |  |  |  |  |  |
|  | Vinyl compound 2 | 22.1 | 19.9 | 14.1 | 12.3 | 23.5 | 10.9 |
| Component B | BMI1 |  |  |  |  |  |  |
|  | BMI2 | 2.9 | 5.1 | 10.9 | 12.7 | 1.5 | 14.1 |
|  | BMI3 |  |  |  |  |  |  |
|  | BMI4 |  |  |  |  |  |  |
| Component C | Elastomer 1 |  |  |  |  |  |  |
|  | Elastomer 2 |  |  |  |  |  |  |
|  | Elastomer 3 | 75.0 | 75.0 | 75.0 | 75.0 | 75.0 | 75.0 |
|  | Elastomer 4 |  |  |  |  |  |  |
|  | Elastomer 5 |  |  |  |  |  |  |
|  | Elastomer 7 |  |  |  |  |  |  |
|  | Elastomer 8 |  |  |  |  |  |  |
|  | Elastomer 9 |  |  |  |  |  |  |
| Component D | Aerosil RX200 |  |  |  |  |  |  |
| Other Components | NC3000H |  |  |  |  |  |  |
|  | 2E4MZ |  |  |  |  |  |  |
| Solvent | THF | 340 | 340 | 340 | 340 | 340 | 340 |
| Film property |  | ○ | ○ | ○ | ○ | ○ | ○ |
| 90° peel strength | Peel test 1 (LCP) | 8.8 | 6.8 | 6.3 | 6.2 | 8.8 | 3.4 |
| (N/cm) | Peel test 2 (Cu) | 8.0 | 10.0 | 9.3 | 8.2 | 11.0 | 6.6 |
| Solder heat | Solder test 1  treatment 1 | ○ | ○ | ○ | ○ | ○ | ○ |
| resistance test | (LCP)             treatment 2 | ○ | ○ | ○ | ○ | xSwollen | ○ |
|  | Solder test 2  treatment 1 | ○ | ○ | ○ | ○ | ○ | ○ |
|  | (Cu)             treatment 2 | ○ | ○ | ○ | ○ | xSwollen | ○ |
| Seam-folding test (times) |  | >5 | >5 | >5 | >5 | >5 | >5 |
| Dielectric properties | Dielectric constant (ε) | 2.36 | 2.38 | 2.41 | 2.42 | 2.36 | 2.43 |
| (10 GHz) | Dielectric tangent (tanδ) | 0.0015 | 0.0018 | 0.0027 | 0.0030 | 0.0013 | 0.0032 |
| Storage modulus | Maximum value | 5.0E+06 | 5.6E+06 | 1.1E+07 | 2.1E+07 | 4.3E+06 | 2.9E+07 |
| (Pa) | Minimum value | 1.5E+06 | 1.6E+06 | 7.9E+06 | 1.7E+07 | 1.6E+06 | 2.0E+06 |

TABLE 4

Changes in physical properties due to structures of Components
(A) and (B) and Effects of Component (D) and other components.

|  |  | Ex. 15 | Ex. 16 | Ex. 17 | Ex. 18 | Ex. 19 |
|---|---|---|---|---|---|---|
| Component (A) vinyl group number:Component (B) maleimide group number |  | 1.0:2.0 | 1.0:2.0 | 1.0:2.0 | 1.0:2.0 | 1.0:2.0 |
| Component A | Vinyl compound 1 | 12.2 |  |  |  |  |
|  | Vinyl compound 2 |  | 18.8 | 18.8 | 19.4 | 16.4 |
| Component B | BMI1 |  |  | 6.2 |  |  |
|  | BMI2 | 12.8 |  |  |  | 8.6 |

TABLE 4-continued

Changes in physical properties due to structures of Components
(A) and (B) and Effects of Component (D) and other components.

|  |  |  | Ex. 15 | Ex. 16 | Ex. 17 | Ex. 18 | Ex. 19 |
|---|---|---|---|---|---|---|---|
|  | BMI3 |  |  |  | 6.2 |  |  |
|  | BMI4 |  |  |  |  | 5.6 |  |
| Component C | Elastomer 1 |  |  |  |  |  |  |
|  | Elastomer 2 |  |  |  |  |  |  |
|  | Elastomer 3 |  | 75.0 | 75.0 | 75.0 | 75.0 | 75.0 |
|  | Elastomer 4 |  |  |  |  |  |  |
|  | Elastomer 5 |  |  |  |  |  |  |
|  | Elastomer 7 |  |  |  |  |  |  |
|  | Elastomer 8 |  |  |  |  |  |  |
|  | Elastomer 9 |  |  |  |  |  |  |
| Component D | Aerosil RX200 |  |  |  |  |  | 10 |
| Other Components | NC3000H |  |  |  |  |  |  |
|  | 2E4MZ |  |  |  |  |  |  |
| Solvent | THF |  | 340 | 340 | 340 | 340 | 340 |
| Film property |  |  | ○ | ○ | ○ | ○ | ○ |
| 90° peel strength | Peel test 1 (LCP) |  | 7.0 | 8.0 | 7.8 | 8.0 | 6.3 |
| (N/cm) | Peel test 2 (Cu) |  | 7.5 | 9.5 | 11.0 | 13.2 | 7.4 |
| Solder heat | Solder test 1 | treatment 1 | ○ | ○ | ○ | ○ | ○ |
| resistance test | (LCP) | treatment 2 | ○ | ○ | ○ | ○ | ○ |
|  | Solder test 2 | treatment 1 | ○ | ○ | ○ | ○ | ○ |
|  | (Cu) | treatment 2 | ○ | ○ | ○ | ○ | ○ |
| Seam-folding test (times) |  |  | >5 | >5 | >5 | >5 | >5 |
| Dielectric properties | Dielectric constant ($\varepsilon$) |  | 2.42 | 2.41 | 2.41 | 2.37 | 2.53 |
| (10 GHz) | Dielectric tangent (tan$\delta$) |  | 0.0031 | 0.0026 | 0.0021 | 0.0013 | 0.0024 |
| Storage modulus | Maximum value |  | 1.0E+07 | 4.9E+06 | 5.6E+06 | 4.3E+06 | 1.1E+07 |
| (Pa) | Minimum value |  | 1.5E+06 | 1.4E+06 | 1.6E+06 | 1.6E+06 | 1.5E+06 |

The details of each components in Tables 1 to 4 are shown below.

Component (A)

Vinyl compound 1: oligophenylene ether (that is a compound represented by formula (4)) (OPE2St-200, manufactured by Mitsubishi Gas Chemical Company, Inc., number average molecular weight=1200)

Vinyl compound 2: oligophenylene ether (that is a compound represented by formula (4)) (OPE2S-2200, manufactured by Mitsubishi Gas Chemical Company, Inc., number average molecular weight=2200)

Component (B)

BMI 1: Compound represented by formula (10) (4,4'-diphenylmethane bismaleimide)

BMI 2: Compound represented by formula (12) (bisphenol A phenyl ether bismaleimide)

BMI 3: Compound represented by formula (13) (novolak type polyfunctional maleimide)

BMI 4: Compound represented by formula (14) (1,6'-bismaleimide-(2,2,4-trimethyl)hexane)

Component (C)

Elastomer 1: Polystyrene-poly(ethylene/propylene) block copolymer. Styrene content of 20% by weight, tensile stress at 100% elongation=2.4 MPa, and elongation at break=670%.

Elastomer 2: Polystyrene-poly(ethylene/propylene) block copolymer. Styrene content of 30% by weight, tensile stress at 100% elongation=no value, and elongation at break=less than 100.

Elastomer 3: Polystyrene-poly(ethylene/propylene) block copolymer. Styrene content of 15% by weight, tensile stress at 100% elongation=0.3 MPa, and elongation at break=1400%.

Elastomer 4: Polystyrene-poly(ethylene/propylene) block copolymer. Styrene content of 65% by weight, tensile stress at 100% elongation=no value, and elongation at break=less than 100.

Elastomer 5: Polystyrene-poly(ethylene/butylene) block copolymer. Styrene content of 30% by weight, tensile stress at 100% elongation=1.0 MPa, and elongation at break=580%.

Elastomer 7: Polystyrene-polyisoprene block copolymer. Styrene content of 20% by weight, tensile stress at 100% elongation=2.8 MPa, and elongation at break=730%.

Elastomer 8: Polystyrene-poly(butadiene/butylene) block copolymer. Styrene content of 30% by weight, tensile stress at 100% elongation=0.7 MPa, and elongation at break=780%.

Elastomer 9: Hydrogenated polystyrene-poly(isoprene/butadiene) block copolymer. Styrene content of 12% by weight, tensile stress at 100% elongation=0.7 MPa, and elongation at break=980%.

Component (D)

Aerosil RX200: Hydrophobic silica (manufactured by Nippon Aerosil Co., Ltd.)

Other Components

NC3000H: Biphenyl type epoxy resin
2E4MZ: 2-ethyl-4-methylimidazole

Solvent

THF: tetrahydrofuran

[Preparation of Adhesive Film]

The adhesive composition solution was coated using an applicator on a polyethylene terephthalate film (under the tradename of Purex A43 manufactured by Teijin Dupont Films Ltd.), the film having a thickness of 38 μm and subjected to release treatment with silicone, so that the thickness after being dried was 25 μm.

Next, the resultant was dried for 5 minutes in a ventilated oven set at 100° C. to obtain an adhesive film having a thickness of 25 μm.

[Preparation of Evaluation Samples]

(1) Preparation of Samples for Measuring Peel Strength

The peel strength was measured using samples prepared by pasting LCP films together or copper foils together so as to measure individually the strength relative to the LCP film and the strength relative to the copper foil, as shown below. The peel strength of two kinds of the substrates was measured independently, because it was required to exhibit high adhesiveness relative to two substrates having different properties, and therefore it was also required to know the precise peel strength relative to each substrate. If a sample was prepared using LCP as one substrate and a copper foil as the other substrate to measure the peel strength thereof, the peel strength of only one of the substrates cab be known, which is not sufficient.

(1-1. Peel Test 1): Adhesive Strength Measurement Relative to LCP Film

The adhesive film was laminated with a LCP film (under the trade name of Bextor CT-Z manufactured by Kurary Co., Ltd.) having a thickness of 25 μm using a roll laminator. The working conditions at the time were a roll temperature of 120° C., a pressure of 30 N/cm, and a speed of 0.5 m/minute.

Next, the same LCP film as mentioned above was further laminated thereon, to obtain a laminated body in which two sheets of the LCP films were pasted together through the adhesive composition.

The laminated body was subjected to hot press treatment at 160° C. and 0.5 MPa for two minutes, and then cured by heating in a ventilated oven at 180° C. for 1 hour, and then cut into a size of 10 mm×100 mm to obtain a sample for measuring the peel strength relative to the LCP film.

(1-2. Peel Test 2): Adhesive Strength Measurement Relative to Copper Foil

A sample for measuring the peel strength relative to a copper foil was prepared in the same way as that mentioned above (1-1, peel test 1) except that a copper foil (under the trade name of FQ-VLP manufactured by Mitsui Mining & Smelting Co., Ltd.) having a thickness of 18 μm was used instead of the LCP film. The adhesive surface of the copper foil was the shine surface.

(2) Preparation of Samples for Solder Heat Resistance Test (2-1. Soldering Test 1): Solder Heat Resistant Temperature Measurement in the Case where a LCP Film was Used.

A sample for measuring the solder heat resistant temperature in the case where a LCP film was used was prepared in the same way as that mentioned above (1-1. peel test 1) except that the sample was cut into a size of 25 mm×25 mm.

(2-2. Soldering Test 2): Solder Heat Resistant Temperature Measurement in the Case where a Copper Foil was Used.

A sample for measuring the solder heat resistant temperature in the case where a copper foil was used was prepared in the same way as that mentioned above (1-2. peel test 2) except that the sample was cut into a size of 25 mm×25 mm.

(3) Preparation of Samples for Seam-Folding Test

A sample for seam-folding test was prepared in the same way as that mentioned above (1-2. peel test 2) except that the sample was cut into a size of 20 mm×100 mm.

(4) Preparation of Samples for Measuring Dielectric Constant and Dielectric Tangent An adhesive film having a thickness of 25 μm was sequentially laminated using a roll laminator to obtain an adhesive composition having a thickness of 200 μm.

Next, the resultant was cured by heating in a ventilated oven at 180° C. for 1 hour, and then cut into a size of 2 mm×50 mm to obtain samples for measuring the dielectric constant and the dielectric tangent.

The laminating step and the curing by heating step were conducted in a state in which Purex A43 was laminated on both surfaces of the adhesive composition, and the Purex A43 was removed just before the measurement.

(5) Preparation of Samples for Measuring Storage Modulus

An adhesive film having a thickness of 25 μm was laminated using a roll laminator to obtain an adhesive composition having a thickness of 50 μm.

Next, the resultant was cured by heating in a ventilated oven at 180° C. for 1 hour, and then cut into a size of 4 mm×30 mm to obtain samples for measuring the dielectric constant and the storage modulus.

The laminating step and the curing by heating step were conducted in a state in which Purex A43 was laminated on both surfaces of the adhesive composition, and the Purex A43 was removed just before the measurement.

[Evaluation Content and Judgment Criteria]

(1) State of Adhesive Film

The appearance of the adhesive film after being dried was evaluated. The case where the surface was smooth and free from defects such as cracks, orange peel, and brushing was evaluated as ○, and the case where any abnormality was observed as evaluated as x.

(2) Measurement of Peel Strength

The substrate was peeled off in the direction of 90° using a universal tensile strength testing machine (manufactured by Orientec Co., Ltd.) to measure the peel strength. The tensile rate was 50 mm/minute.

The case where the peel strength relative to the LCP film or the copper foil was 4N/cm or more was evaluated as good, and the case where the peel strength was less than 4N/cm was evaluated as no-good.

(3) Solder Heat Resistance Test

The samples were subjected to humidity conditioning treatment at 20° C. and 65% RH for 96 hours (indicated as treatment 1 in Tables 1 to 4), or at 40° C. and 90% RH for 96 hours (indicated as treatment 2 in Tables 1 to 4), followed by making each of the resultants flow in a solder bath at 300° C. for 60 seconds.

The case where no abnormality occurred during the flow for 60 seconds was evaluated as ○, and the case where abnormality such as swollenness, break, or peeling occurred was evaluated as x.

(4) Seam-Folding Test

The samples each having a size of 20 mm×100 mm were folded in two lightly in the longitudinal direction, and then were placed on 300 mm×300 mm SUS 304 plates each having a thickness of 5 mm, followed by applying a load thereon by reciprocating a manual roller defined in JIS C-2107 Annex A (hereinafter, referred to as roller) once in the longitudinal direction to form a crease, respectively.

Next, the two-layered samples were placed on the SUS plates, and one layer of two layers thereof was lifted to apply a load on the other layer thereof by reciprocating the roller once from an end portion thereof in the longitudinal direction to extend the samples.

The series of the work was counted as one time seam-folding, and the state of the copper foil was checked when every series was ended to obtain the number of times in which no crack occurred in the copper foil as seam-folding times.

(5) Measurement of Dielectric Constant and Dielectric Tangent

The dielectric constant ($\varepsilon$) and the dielectric tangent (tan $\delta$) were measured at 10 GHz in accordance with the cavity resonator perturbation method.

(6) Preparation of Samples for Measuring Storage Modulus

The storage modulus was measured by dynamic viscoelasticity measurement. The measurement frequency was set at 11 Hz. The measurement was started at 25°, and continued up to 150° C. while raising the temperature at 10°

C./minute up to obtain the maximum value and the minimum value at 25° C. to 150° C.

Evaluation Results

Examples 1 to 6

Elastomers 1, 3, 5, 7, 8, and 9 having a styrene content of 10 to 40% by weight, a tensile stress at 100% elongation of 0.1 to 2.9 MPa, and an elongation at break of 100% or greater were used, the dielectric constant (ε) of each raw materials was 3.0 or less, the dielectric tangent (tan δ) thereof was 0.005 or less, the peel strength relative to the LPC film or the copper foil was 4N/cm or more, there was no abnormality in the solder float test at 300° C. for 60 seconds, the laminated structure with the copper foil had folding endurance times of five times or more, and thus good properties were conformed.

Comparative Example 1

In the case where Elastomer 2 having an elongation at break of less than 100% was used, cracks occurred when the adhesive composition was coated on the substrate, and then dried to form a film, and therefore a sample for evaluation could not be prepared.

Comparative Example 2

In the case where Elastomer 4 having a styrene content of more than 40% by weight, an adhesive film was hard and easily broken when bent, and therefore a sample for evaluation could not be prepared.

Examples 7 to 10

In the case where the proportion of the component (C) (elastomer) relative to the total weight of the component (A), the component (B), and the component (C) was 55 to 95% by weight, good values were conformed in all evaluations.

Comparative Example 3

In the case where the proportion of the component (C) (elastomer) relative to the total weight of the component (A), the component (B), and the component (C) was 45% by weight, each components were separated in the adhesive composition solution, and the thickness unevenness and cracks occurred in the film formed by coating and drying the solution, and therefore a sample for evaluation could not be prepared.

Comparative Example 4

In the case where the proportion of the component (C) (elastomer) relative to the total weight of the component (A), the component (B), and the component (C) was 97.5% by weight, both the LCP film sample and the copper foil sample were swollen after being treated at 40° C. and 90% RH for 96 hours in the solder heat resistance test.

Examples 11 to 14

The equivalent ratio of vinyl groups in the component (A) and maleimide groups in the component (B) was within the range of 1.0:0.5 to 1.0:4.0, good values were conformed in all evaluations.

Comparative Example 5

In the case where the amount of maleimide groups were decreased such that the equivalent ratio of vinyl groups in the component (A) and maleimide groups in the component (B) was 1.0:0.25, both the LCP film sample and the copper foil sample were swollen after being treated at 40° C. and 90% RH for 96 hours in the solder heat resistance test.

Comparative Example 6

In the case where the amount of maleimide groups were increased such that the equivalent ratio of vinyl groups in the component (A) and maleimide groups in the component (B) was 1.0:5.0, the peel strength relative to the LCP film was less than 4N/cm.

Examples 15 to 18

In the case where the molecular weight of the component (A) was decreased, good values were confirmed in all evaluations even when different compounds were used as the component (B).

Example 19

In the case where a filler was added in the composition prepared in Example 2, good values were confirmed in all evaluations.

INDUSTRIAL APPLICABILITY

The thermosetting adhesive composition according to the present invention has a low dielectric constant and a low dielectric tangent, exhibits a high adhesive strength relative to a LCP film or a copper foil, has a sufficiently high heat resistance to endure a rapid heating at a soldering process and a sufficiently high flexibility to endure a folding, and is suitable as an adhesive raw material of FPC with LCP film, specifically, as an adhesive raw material of a bonding sheet, a cover lay film, FRCC, or FCCL with adhesive agent.

The invention claimed is:

1. A thermosetting adhesive composition consisting of:
 a component (A) that is a vinyl compound having a polyphenylene ether skeleton represented by formula (1);
 a component (B) that is a maleimide resin having at least two maleimide groups in a molecule thereof; and
 a component (C) that is a thermoplastic elastomer that is a copolymer of a polyolefin block and a polystyrene block comprising a polyolefin skeleton as a main component thereof,
 wherein an equivalent ratio of vinyl groups in the component (A) and the maleimide groups in the component (B) is 1.0: 0.5 to 1.0:4.0,
 the proportion of the component (C) in a total weight of the component (A), the component (B), and the component (C) is 75 to 95% by weight, and
 for the component (C), the ratio of styrene units with respect to a total weight of the component (C) is 10 to 40% by weight, a tensile stress at 100% elongation is 0.1 to 2.9 MPa, and an elongation at break is 100% or greater, (1)

[Chemical structure of formula (1)]

in the formula (1), substituents $R^1$, $R^2$, $R^3$, and $R^4$, each represent a hydrogen atom, a halogen atom, an alkyl group, a phenyl group, or a haloalkyl group, X represents an organic group having at least one carbon atom, and the organic group may comprise an oxygen atom, a sulfur atom, or a halogen atom;

a and d each represent 0 or 1,

Y is represented by formula (2), b and c each represent an integer of 0 to 20, but b and c are not simultaneously 0, and Z is represented by formula (3), (2)

[Chemical structure of formula (2)]

(3)

[Chemical structure of formula (3)]

wherein, $R^5$, $R^6$, $R^7$, and $R^8$ each represents a hydrogen atom, a halogen atom, an alkyl group having 1 to 6 carbon atoms, or a phenyl group;

$R^9$, $R^{10}$, $R^{11}$, $R^{12}$, $R^{13}$, $R^{14}$, $R^{15}$, and $R^{16}$ each represents a hydrogen atom, a halogen atom, an alkyl group having 1 to 6 carbon atoms, or a phenyl group, A represents a single bond or a linear, branched, or cyclic hydrocarbon group having 1 to 20 carbon atoms, and

* represents a binding site with an oxygen atom.

2. The thermosetting adhesive composition according to claim 1, wherein the component (A) is represented by formula (4):

(4)

[Chemical structure of formula (4)]

in the formula (4), Y satisfies a structure in which one of formula (5) and formula (5') is arranged or two thereof are arranged at random:

(5)

[Chemical structure of formula (5)]

(5')

[Chemical structure of formula (5')]

in the formula (5) and formula (5'), *$^1$ represents a binding site with an oxygen atom in the formula (4), and *$^2$ represents a binding site with a carbon atom in the formula (4).

3. The thermosetting adhesive composition according to claim 1, wherein the component (B) is at least one selected from the group consisting of compounds having structures represented by formulae (6) to (9):

(6)

[Chemical structure of formula (6)]

wherein $R^{17}$ to $R^{24}$ each represents a hydrogen atom or an alkyl group having 1 to 6 carbon atoms, and B represents a single bond, a divalent hydrocarbon group having 1 to 20 carbon atoms, or an oxygen atom, (7)

[Chemical structure of formula (7)]

wherein $R^{25}$ to $R^{32}$ each represents a hydrogen atom or an alkyl group having 1 to 6 carbon atoms, and D represents a divalent hydrocarbon group having 1 to 20 carbon atoms,

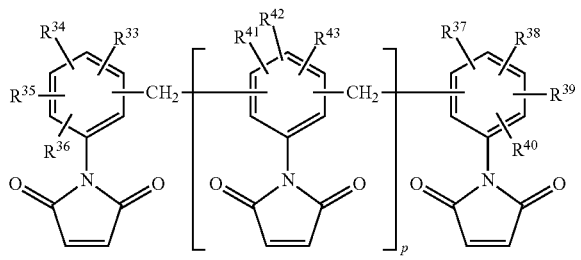

(8)

wherein $R^{33}$ to $R^{43}$ each represents a hydrogen atom or an alkyl group having 1 to 6 carbon atoms, and p represents an integer of 1 to 20, and

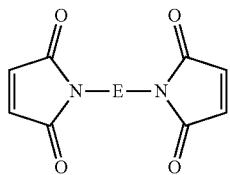

(9)

wherein E represents a divalent aliphatic hydrocarbon group having 1 to 20 carbon atoms.

4. The thermosetting adhesive composition according to claim 1, wherein the component (C) is at least one selected from the group consisting of a polystyrene-poly(ethylene/propylene) block copolymer, a polystyrene-poly(ethylene/butylene) block copolymer, a polystyrene-polyisoprene block copolymer, a polystyrene-poly(butadiene/butylene) block copolymer, and a hydrogenated polystyrene-poly(isoprene/butadiene) block copolymer.

5. The thermosetting adhesive composition according to claim 1, wherein a storage modulus when the thermosetting adhesive composition is cured by being heated at a rate of 180° C/hour from 25 to 150° C. has a minimum value of $1 \times 10^5$ Pa or more and a maximum value of $1 \times 10^8$ Pa or less.

6. A thermosetting adhesive film comprising: a substrate; and the thermosetting adhesive composition of claim 1 provided on the substrate, wherein the substrate is a releasable film substrate, a releasable paper substrate, a copper foil substrate, or a heat-resistant film substrate.

7. The thermosetting adhesive film according to claim 6, wherein the substrate is the heat-resistant film substrate.

8. The thermosetting adhesive film according to claim 7, further comprising a copper foil layer laminated on the thermosetting adhesive composition.

9. The substrate-laminating thermosetting adhesive film according to claim 7, wherein the heat-resistant film substrate is a liquid crystal polymer film.

10. A film obtained by curing the thermosetting adhesive film of claim 6.

11. A composite film comprising: at least one substrate selected from the group consisting of a copper foil, a heat-resistant film, and a laminate film of both a copper foil and a heat-resistant film; and at least one thermosetting adhesive film of claim 6, wherein at least one sheet of the at least one substrate and at least one sheet of the at least one thermosetting adhesive film are laminated together.

\* \* \* \* \*